Patented May 19, 1936

2,040,862

UNITED STATES PATENT OFFICE 2,040,862

COMPOUNDS OF THE ANTHRAPYRIMIDINE SERIES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application July 5, 1935, Serial No. 30,010. In Germany January 21, 1931

3 Claims. (Cl. 260—32)

The present invention relates to compounds of the anthrapyrimidine series. The application is a continuation-in-part of our copending application Serial No. 628,440.

We have found that valuable compounds of the anthrapyrimidine series can be obtained by the interaction of 1.6 - diaminoanthraquinone or 1-amino-6-methylaminoanthraquinone with formamide. If desired, catalysts may be employed, as for example salts of vanadic or molybdic or tungstic acid. The reaction is carried out at between about 100° and 200° C. and preferably in the presence of diluents, such as nitrobenzene or phenol or its homologues. It may also be carried out by employing an excess of the carboxylic acid amide as the diluent.

The reaction products according to the present invention are usually obtained in good yields and in a crystalline form. If necessary, they may be purified for example by crystallization, sublimation, or by way of their salts with strong mineral acids, such as sulfuric acid. They may be used as valuable intermediate products for the preparation of dyestuffs.

The following examples will further illustrate how the said invention may be carried out in practice, but the invention is not restricted to these examples. The parts are by weight.

Example 1

50 parts of 1.6-diaminoanthraquinone are heated to boiling for some hours with 100 parts of formamide, 100 parts of phenol and 2.5 parts of ammonium vanadate. The reaction mixture is then cooled to about 80° C. After diluting it with 200 parts of ethanol the reaction product separated is filtered off by suction. It forms brown-red needles which after crystallization from trichlor-benzene melt at between 304° and 305° C., dissolving in concentrated sulfuric acid giving a yellow coloration which does not change by adding formaldehyde. By diluting the sulfuric acid solution with water the coloration turns blue. The compound gives an orange-red vat from which cotton is dyed orange-red shades. The compound may also be employed for dyeing acetyl cellulose giving the same shade of color. It is 6-amino-1.9-anthrapyrimidine.

Example 2

50 parts of 1-amino-6-methylaminoanthraquinone are heated to boiling for some hours at from 180° to 185° C. together with 100 parts of formamide, 100 parts of nitrobenzene and 2.5 parts of ammonium vanadate, until a sample withdrawn and dissolved in concentrated sulfuric acid does no longer change in color upon the addition of formaldehyde. Then the reaction mixture is cooled to about 85° C. The nitrobenzene is then removed by steam distillation and the residue purified by way of its sulfate. After recrystallization from ortho-dichlor-benzene the reaction product forms red violet needles which dissolve in concentrated sulfuric acid giving a green coloration which upon the addition of water turns blue. The reaction product which is 6-methylamino-1.9-anthrapyrimidine dissolves in organic solvents giving yellowish-red coloration.

What we claim is:

1. Compounds of the anthrapyrimidine series corresponding to the general formula:

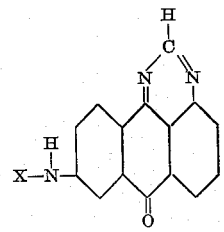

in which X stands for hydrogen or methyl.

2. 6 - amino - 1.9 - anthrapyrimidine forming brown-red needles by crystallization from trichlorbenzene which melt at between 304° and 305° C. dissolving in concentrated sulfuric acid giving a yellow coloration which does not change by adding formaldehyde, giving an orange-red vat, dyeing cotton and acetyl cellulose orange-red shades.

3. 6-methylamino-1.9-anthrapyrimidine forming red-violet needles dissolving in concentrated sulfuric acid giving a green coloration which upon the addition of water turns blue.

MAX ALBERT KUNZ.
KARL KOEBERLE.